United States Patent
Scarpa et al.

(10) Patent No.: US 8,306,145 B2
(45) Date of Patent: Nov. 6, 2012

(54) OVERLAY MODULATION OF COFDM USING PHASE AND AMPLITUDE OFFSET CARRIERS

(75) Inventors: Carl Scarpa, Plainsboro, NJ (US); Edward Schell, Jackson, NJ (US); Christopher Strolle, Fort Washington, PA (US)

(73) Assignee: Sirius XM Radio Inc., New York, NY (US)

( * ) Notice: Subject to any disclaimer, the term of this patent is extended or adjusted under 35 U.S.C. 154(b) by 742 days.

(21) Appl. No.: 12/416,027

(22) Filed: Mar. 31, 2009

(65) Prior Publication Data

US 2009/0279418 A1    Nov. 12, 2009

Related U.S. Application Data

(60) Provisional application No. 61/072,637, filed on Mar. 31, 2008.

(51) Int. Cl.
*H04L 27/10* (2006.01)
(52) U.S. Cl. ......................................................... 375/283
(58) Field of Classification Search .................. 375/283, 375/260, 244, 303, 308, 329, 330
See application file for complete search history.

(56) References Cited

U.S. PATENT DOCUMENTS

| | | |
|---|---|---|
| 6,947,741 B2 | 9/2005 | Beech et al. |
| 2006/0215790 A1* | 9/2006 | Dibiaso et al. ................ 375/330 |
| 2008/0043814 A1 | 2/2008 | Moffatt |

OTHER PUBLICATIONS

Patrick A. Count, Performance Analysis of OFDM in Frequency-Selective, Slowly Fading Nakagami Channels. Thesis, Naval Postgraduate School, Monterrey, CA, Dec. 19, 2001.
International Search Report and Written Opinion of the International Searching Authority, issued for corresponding PCT Application PCT/US2009/039027, dated Jun. 4, 2009.

* cited by examiner

*Primary Examiner* — Kevin Kim
(74) *Attorney, Agent, or Firm* — Kramer Levin Naftalis & Frankel LLP (57) ABSTRACT

Systems and methods are presented for transmitting additional data over preexisting differential COFDM signals by modulating existing data carriers with a phase and an amplitude offset. In exemplary embodiments of the present invention, additional data capacity can be achieved for an COFDM signal which is completely backwards compatible with existing satellite broadcast communications systems. In exemplary embodiments of the present invention additional information can be overlayed on an existing signal as a combination of amplitude and phase offset from the original QPSK symbols, applied for each information bit of the overlay data. With two additional levels of modulation, a receiver can demodulate the information from each of the previous stages and combine the information into a suitable format for soft decoding. The first stage of demodulation will be recovery of overlay data from the amplitude modulated D8PSK. Because other amplitude variations due to multi-path are also expected, the data gathered from the FFT in the receiver must be equalized to the channel conditions. After channel equalization has been performed, soft overlay data can then be derived from the distance off the unit circle. In order to recover the phase modulated overlay data, the equalized symbols must first be differentially demodulated and corrected for any common phase error offset. After common phase removal, overlay phase information can be obtained.

21 Claims, 8 Drawing Sheets

Generalized COFDM Modulator

Fig. 1 - Generalized COFDM Modulator

Fig. 4 - Generalized COFDM De-Modulator

OVERLAY MODULATION OF COFDM USING PHASE AND AMPLITUDE OFFSET CARRIERS

CROSS REFERENCE TO RELATED APPLICATIONS

This application claims the benefit of and hereby incorporates by reference U.S. Provisional Patent Application No. 61/072,637 entitled "OVERLAY MODULATION OF COFDM USING PHASE AND AMPLITUDE OFFSET CARRIERS", filed on Mar. 31, 2008.

TECHNICAL FIELD

The present invention relates to satellite broadcast communications, and more particularly to methods and systems for transmitting additional data over preexisting differential Coded Orthogonal Frequency Division Multiplexing (COFDM) signals by modulating existing data carriers with a phase and amplitude offset.

BACKGROUND INFORMATION

Existing satellite broadcast communication systems, such as, for example, the one currently utilized by Sirius Satellite Radio, employ two forms of modulation to convey information, single carrier Quadrature Phase Shift Keying (QPSK) and multicarrier differential COFDM.

QPSK is a modulation technique that allows for the transmission of digital information across an analog channel. In QPSK, data bits are grouped into pairs with each pair represented by a particular waveform, commonly referred to as a symbol. There are four possible combinations of data bits in a pair, and a unique symbol is required for each possible combination of data bits in a pair. QPSK creates four different symbols, one for each pair, by changing the I gain and Q gain for the respective cosine and sine modulators. The symbol is then sent across an analog channel after modulating a single carrier. A receiver can demodulate the signal and look at the recovered symbol to determine which combination of data bits was sent in an original pair.

COFDM, or Coded Orthogonal Frequency-division Multiplexing (COFDM) is a frequency-division multiplexing (FDM) scheme utilized as a digital multi-carrier modulation method. A large number of closely-spaced orthogonal sub-carriers are used to carry data. The data is divided into several parallel data streams or channels, one for each sub-carrier. Each sub-carrier is modulated with a conventional modulation scheme (such as, for example, quadrature amplitude modulation (QAM) or phase shift keying (QPSK)) at a low symbol rate, maintaining total data rates similar to conventional single-carrier modulation schemes in the same bandwidth. For example, a COFDM system can distribute a single digital signal across 1,000 or more signal carriers simultaneously. Coded data is modulated and inserted into orthogonal carriers in the frequency domain. Because signals are sent at right angles to each other, the signals do not interfere with one another.

One problem that occurs in all RF transmission is multi-path effects. This refers to the scattering of a signal due to obstructions such as canyons, buildings, etc., that can cause a signal to take two or more paths to reach its final destination. COFDM is highly resistant to multi-path effects because it uses multiple carriers to transmit the same signal, making it a robust transmission method. However, the current modulation techniques used by satellite broadcast communication systems, cannot convey additional information overlaid on an COFDM signal. As overlay modulation, or multi-layer modulation is a useful and efficient method to optimize available bandwidths, the ability to overlay COFDM signals with multiple layers of modulation is highly desirable. In systems where overlay modulation is contemplated that include a COFDM transmission in addition to, for example, other transmissions, such as Time Division Multiplexing (single carrier) transmissions, it would be very useful to be able to implement the overlay technique on COFDM as well, so that the entire system can support overlay modulation.

What is thus needed in the art is an alternative implementation of COFDM that can overcome or ameliorate the problems of the prior art.

SUMMARY OF THE INVENTION

Systems and methods are presented for transmitting additional data over preexisting differential COFDM signals by modulating existing data carriers with a phase and an amplitude offset. In exemplary embodiments of the present invention, additional data capacity can be achieved for an COFDM signal which is completely backwards compatible with existing satellite broadcast communications systems. In exemplary embodiments of the present invention additional information can be overlayed on an existing signal as a combination of amplitude and phase offset from the original QPSK symbols, applied for each information bit of the overlay data. With two additional levels of modulation, a receiver can demodulate the information from each of the previous stages and combine the information into a suitable format for soft decoding. The first stage of demodulation will be recovery of overlay data from the amplitude modulated D8PSK. Because other amplitude variations due to multi-path are also expected, the data gathered from the FFT in the receiver must be equalized to the channel conditions. After channel equalization has been performed, soft overlay data can then be derived from the distance off the unit circle. In order to recover the phase modulated overlay data, the equalized symbols must first be differentially demodulated and corrected for any common phase error offset. After common phase removal, overlay phase information can be obtained.

DETAILED DESCRIPTION OF THE INVENTION

In exemplary embodiments of the present invention, additional data can be transmitted over preexisting differential COFDM signals by changing the amplitude and phase of data symbols.

The following systems and methods are proposed for, but not confined to, use in the Sirius Satellite Radio Service Terrestrial Network, a component of Sirius' Sirius Satellite Digital Audio Radio System ("SDARS"). In general, the systems and methods of exemplary embodiments of the present invention can be used in any COFDM system.

Figure 1:
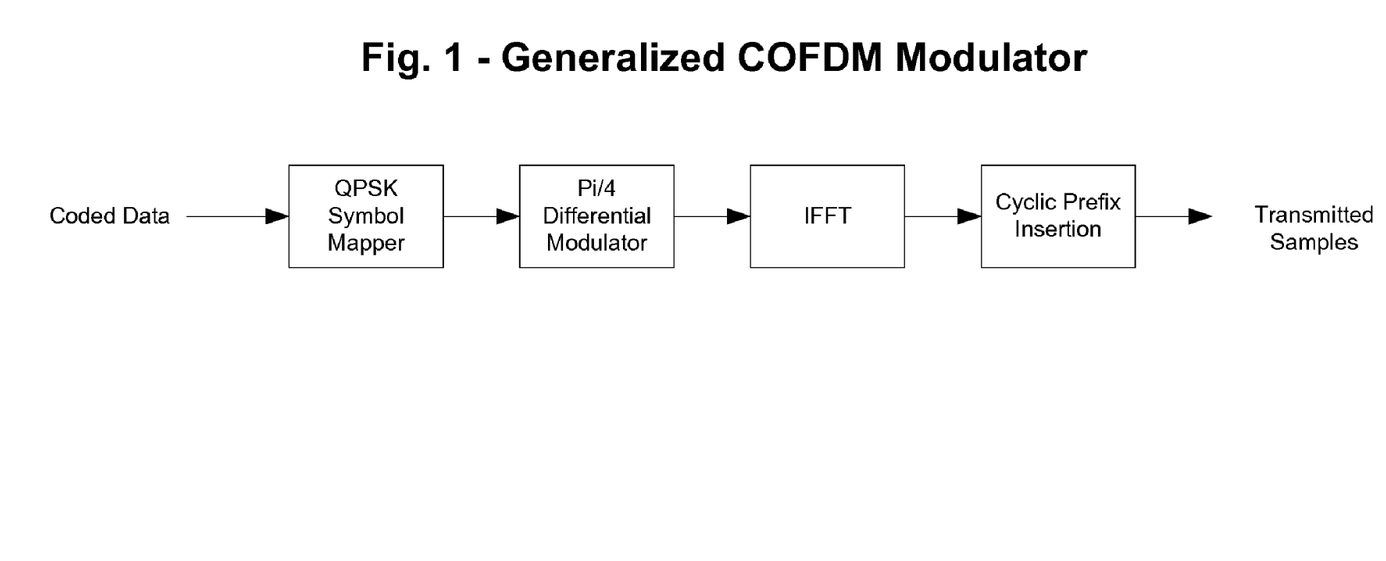
FIG. 1 illustrates the basic structure of an exemplary COFDM encoder according to an exemplary embodiment of the present invention.
Figure 2:
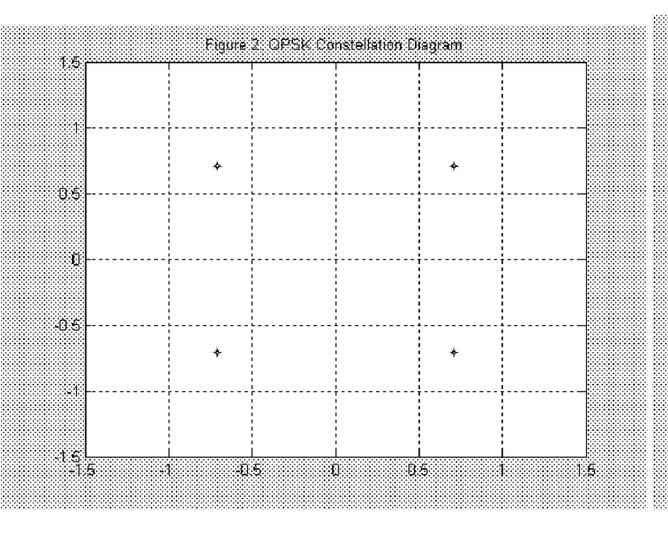
FIG. 2 illustrates a constellation resulting from exemplary QPSK modulation according to an exemplary embodiment of the present invention.
Figure 3:
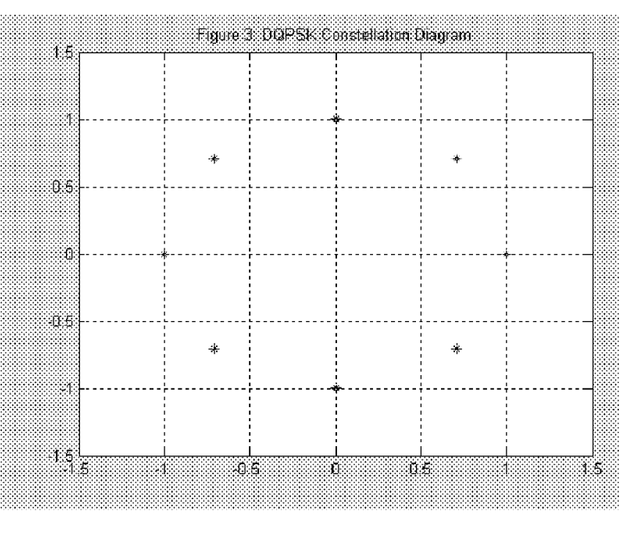
FIG. 3 illustrates a constellation resulting from exemplary differential QPSK modulation according to an exemplary embodiment of the present invention.

As discussed above, in COFDM, coded data is modulated and inserted into orthogonal carriers in the frequency domain. A time waveform is then created by taking an inverse Fast Fourier Transform (FFT) of the modulated carriers and appending a cyclic prefix of the result, known as the guard interval. FIG. 1 illustrates the basic structure of a COFDM encoder. Carrier modulation is QPSK followed by a $\pi/4$ differential modulator, resulting in two bits of information per carrier. Use of the differential modulator places all of the information in the phase difference between carriers. FIG. 2 illustrates a constellation diagram of the QPSK symbols while FIG. 3 illustrates a constellation diagram of the differential QPSK symbols.

Figure 4:
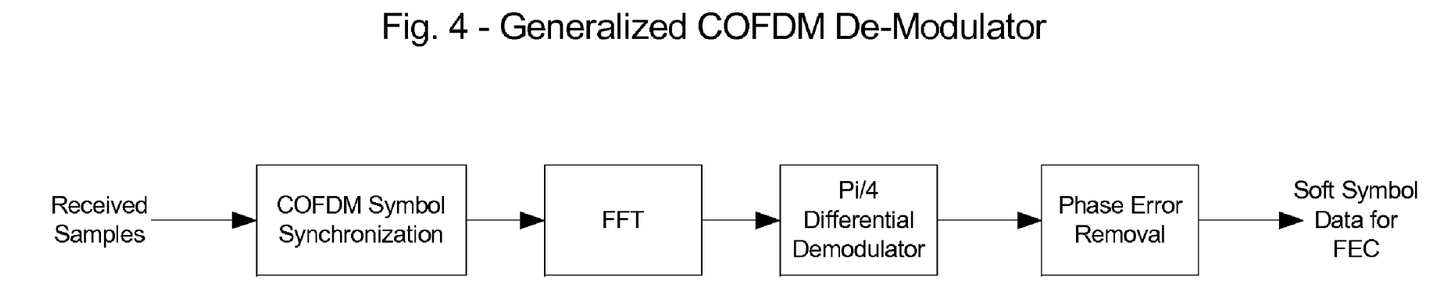
FIG. 4 illustrates the basic structure of a COFDM receiver according to an exemplary embodiment of the present invention.
Figure 5:
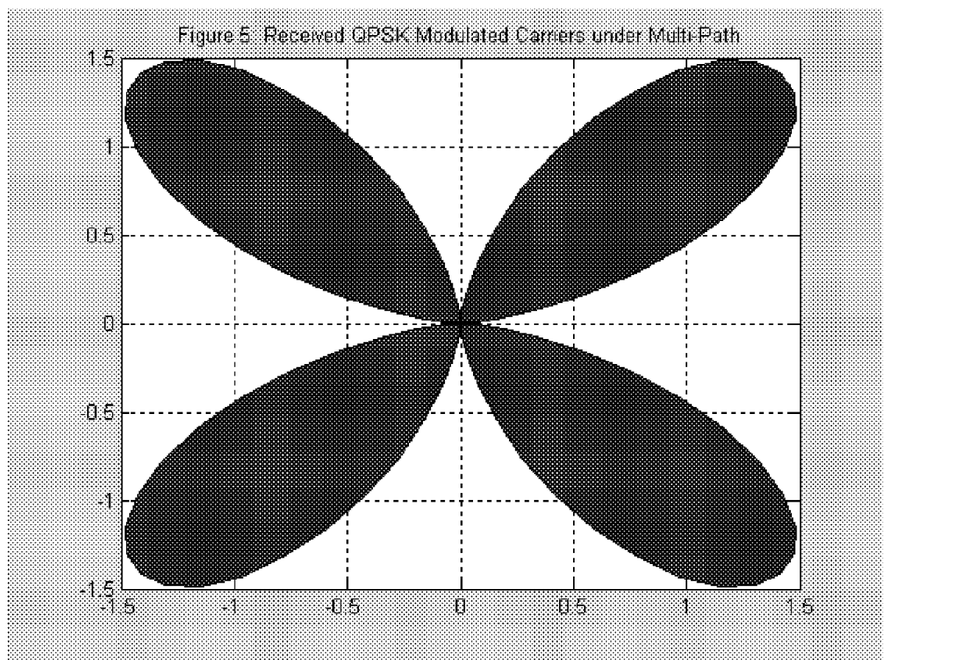
FIG. 5 illustrates a received QPSK signal at modulated carries in a multi-path environment according to an exemplary embodiment of the present invention.

A receiver for the modulation scheme described above recovers the original data by synchronizing to the transmitted waveform, performing an FFT on the appropriate section of data, differential demodulating the data carriers, correcting for the common phase offset and extracting information from the resulting QPSK constellation for soft decoding. FIG. 4 illustrates the basic structure of a COFDM receiver. Due to multi-path conditions, expected in an environment where COFDM would be used, the lack of channel equalization can result in a received QPSK constellation as illustrated in FIG. 5. Notable is the elongated constellation due to the amplitude variations induced by the multi-path environment. Additionally, the petal-like structure of the received constellation will tend to become wider as the signal-to-noise ratio (SNR) is decreased.

To transmit additional data over the current system without changing the existing system constraints, data must be overlaid onto the original information. If the original data symbols are modulated with the additional information, a hierarchical system is created. In exemplary embodiments of the present invention, the additional information can be at a rate of 1 bit/symbol. To convey the additional information, the modulation scheme according to exemplary embodiments of the present invention can, for example, utilize a combination of amplitude and phase offset from the original QPSK symbols, applied for each information bit of the overlay data. Each of the modulation functions can, for example, either send the same information, or separate information at twice the rate. If the same information is used for example, the data can be merged at the receiver for a combining gain and will permit the use of a higher coding rate on the data. If separate information is used, for example, twice as much data can be sent but a lower coding rate will be needed making the overall throughput similar to using the same information. In exemplary embodiments of the present invention, identical information can be used in order to take advantage of the combining gain.

In exemplary embodiments of the present invention a modulation scheme can be separated into two stages. A first stage, for example, can apply a fixed offset angle to the original QPSK prior to differential modulation and thus create a signal similar to one that would result from 8 Phase Shift Keying (8-PSK). The information bit would dictate the direction of the applied offset. An equation to apply such a phase offset to an original QPSK signal is as follows:

$$Ovly1I = \cos(\alpha) * SymI - Z * \sin(\alpha) * SymQ$$

$$Ovly1Q = \cos(\alpha) * SymQ + Z * \sin(\alpha) * SymI$$

Where:
SymI and SymQ are from the original QPSK symbol;
Z is the information bit represented as +/−1;
$\alpha$ = the modulation angle; and
Ovly1I and Ovly1Q form the resulting overlay symbol pair.

Figure 6:
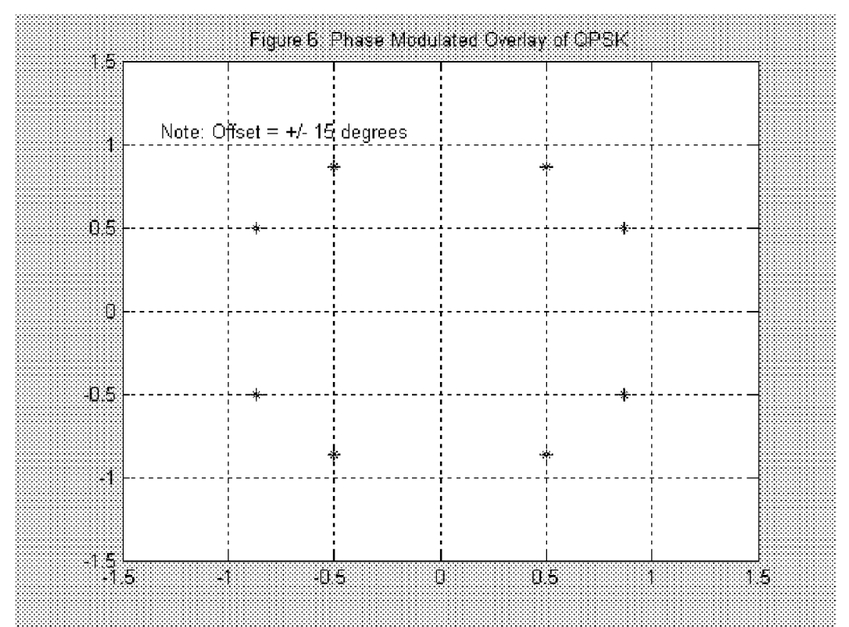
FIG. 6 illustrates a constellation resulting from phase modulated overlay QPSK according to an exemplary embodiment of the present invention.
Figure 7:
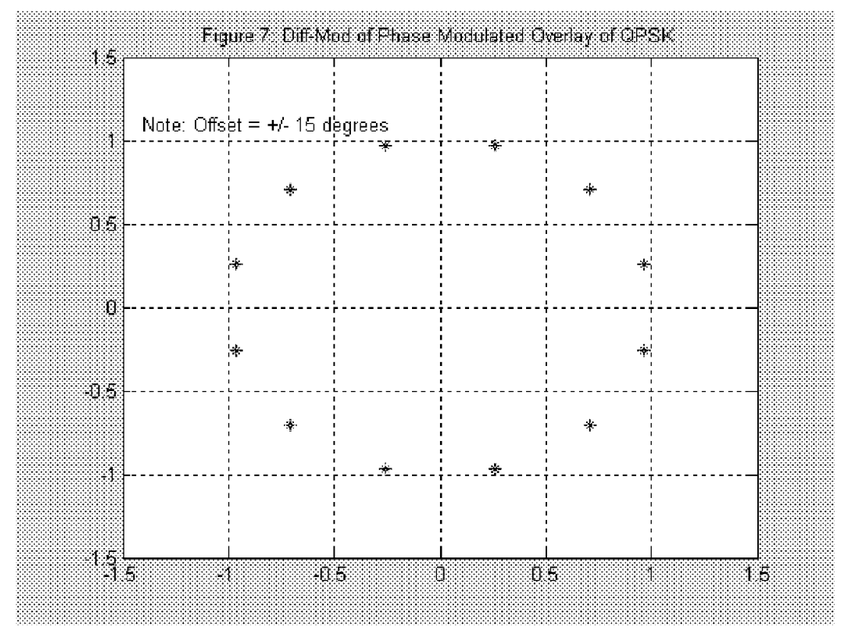
FIG. 7 illustrates a constellation resulting from differential phase modulated overlay QPSK according to an exemplary embodiment of the present invention.

It is noted that because Z is +/−1, it controls the direction of the phase rotation by changing the sign of the mixing function. The degree of offset ($\alpha$) can be, for example, programmable to any angle between 0 and 45 degrees, thus preserving the original quadrant information. However, in exemplary embodiments of the present invention, this angle can preferably be kept small to minimize the performance degradation of the existing system. In one exemplary embodiment, a maximum allowable angle can be, for example, 22.5 degrees, where the symbols would all be of equal distance. FIG. 6 illustrates an exemplary phase modulated QPSK signal while FIG. 7 illustrates an exemplary differentially modulated result of the signal, hereinafter referred to as Differential 8-ary Phase Shift Keying (D8PSK). Because the magnitude of the original symbols is maintained, the average power of the overlay symbols is the same as before.

Figure 8:
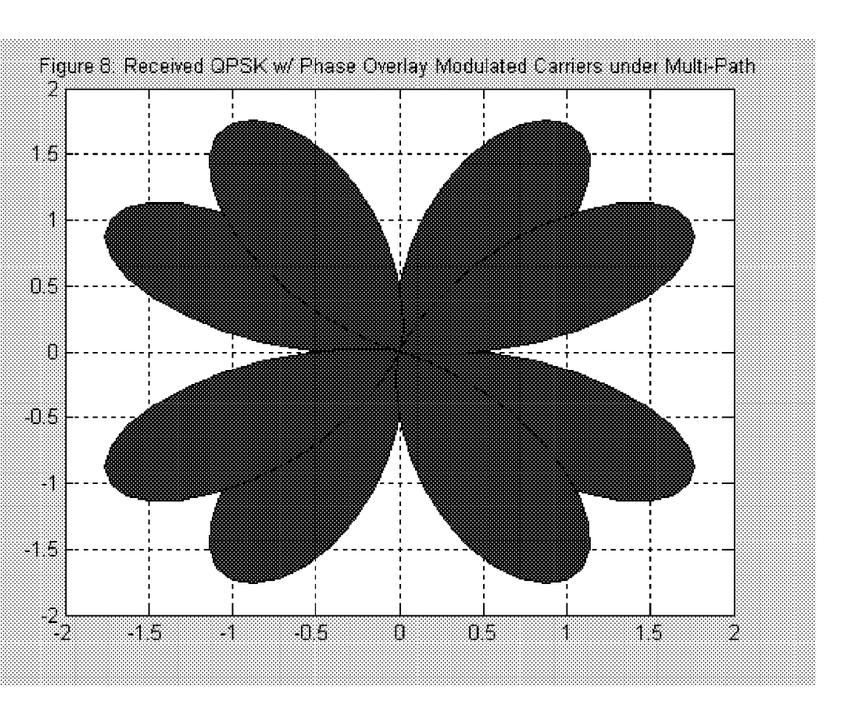
FIG. 8 illustrates a received QPSK signal at phase overlay modulated carriers in a multi-path environment according to an exemplary embodiment of the present invention.

To legacy receivers in a multi-path environment, the phase modulation would cause the formation of a pair of petals, as is illustrated in FIG. 8. As the SNR is decreased, the petals will become less and less distinguishable. Because the original points now start off closer to the adjacent quadrants, errors can begin to occur much sooner than if just the original QPSK signal was sent. If the impact on the performance of current receivers were expected to be minimal, the performance of the overlay data would be greatly restricted, because the maximum permitted offset angle would be reduced.

After the offset angle is applied to the original QPSK signal, the symbols can then, for example, be differentially modulated as in the original system. The differential modulation places all information into the phase between the carriers, thus allowing for additional information to be carried in the amplitude of the signal. At this point, the second phase of the modulation can, for example, be introduced.

Figure 9:
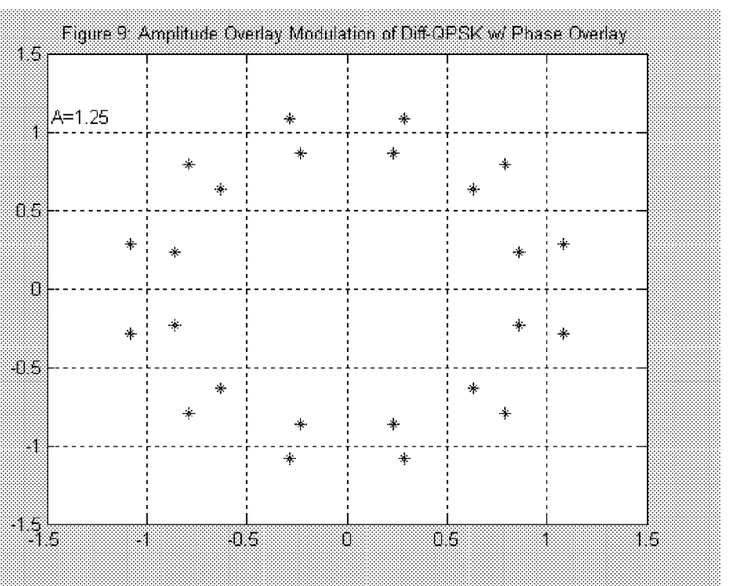
FIG. 9 illustrates a constellation resulting from amplitude overlay modulation of differential QPSK with phase overlay according to an exemplary embodiment of the present invention.

The overlay data can be interleaved in frequency to add diversity between the two overlay modulations. In a multi-path environment, the frequency diversity can help to provide the best combining gain between the two sets of overlay data. Using the interleaved overlay data, the D8PSK signal can, for example, be further modulated in amplitude. For example, the original signal amplitude can be offset by some delta and the information bit can control the sign. FIG. 9 illustrates the application of an amplitude offset to previously phase modulated D8PSK symbols. Exemplary equations to modify the D8PSK symbols can be as follows:

$$Ovly2I = D8pskI * \sqrt{A^{(Z)}}$$

$$Ovly2Q = D8pskQ * \sqrt{A^{(Z)}}$$

Where:
- D8pskI and D8pskQ are the differentially modulated symbol pair;
- A is the desired power offset;
- Z is the overlay data represented as +/−1; and
- Ovly2I and Ovly2Q form the resultant symbol pair.

In exemplary embodiments of the present invention the scaling of the amplitude can be such that the average power will remain the same. The choice of A can be programmable but can, for example, be limited to a range ($1 \leq A \leq K$), where K is chosen suitable to the expected number system of the receivers.

As noted above, amplitude variations due to multi-path conditions can appear as the elongated signal constellations as illustrated in FIG. 5. Therefore, the amplitude variations induced by the overlay modulation would appear as multi-path to existing receivers. Because the data is expected to look random, the effects at the receiver should average out. That is, the overlay symbols will appear as constructive interference half of the time while they will appear as destructive interference the remainder of the time. One of the key advantages of this part of the modulation is the minimal impact on existing receivers. As discussed in greater detail below, recovery of the data will require additional complexity in the new receiver.

Figure 10:
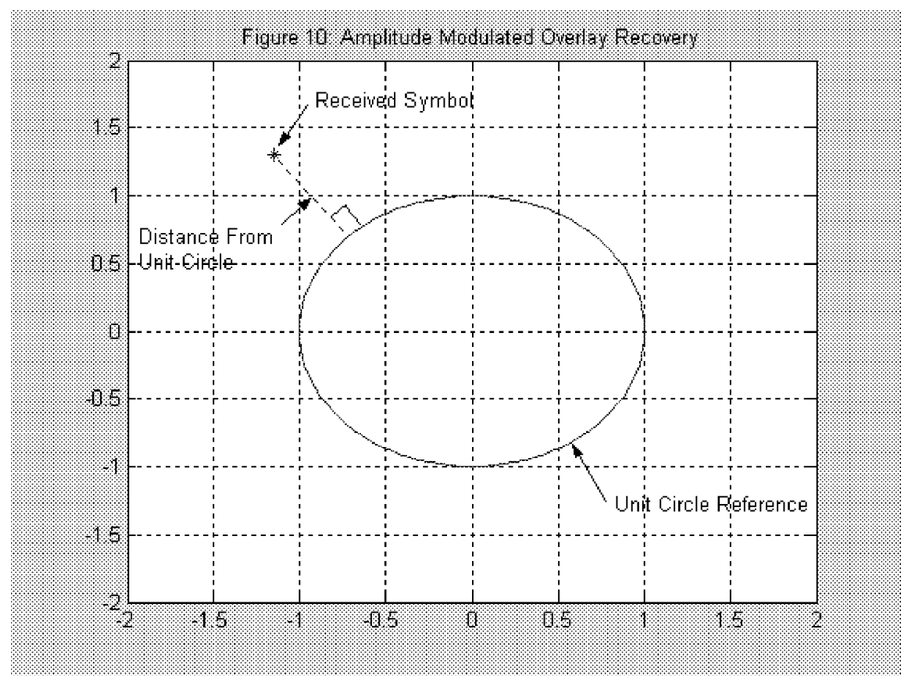
FIG. 10 illustrates amplitude modulated overlay recovery according to an exemplary embodiment of the present invention.

With two additional levels of modulation, a receiver must be designed to demodulate the information from each of the previous stages and combine the information into a suitable format for soft decoding. The first stage of demodulation will be recovery of overlay data from the amplitude modulated D8PSK. Because other amplitude variations due to multi-path are also expected, the data gathered from the FFT in the receiver must be equalized to the channel conditions. Copending U.S. patent application Ser. No. 12/184,659, under common assignment herewith, entitled OVERLAY MODULATION TECHNIQUE FOR COFDM SIGNALS BASED ON AMPLITUDE OFFSETS, filed on Aug. 1, 2008, hereby incorporated by reference in its entirety, describes in detail how to implement channel equalization required for extracting overlay data with a notable complexity. After channel equalization has been performed, the resulting constellation should resemble the rings as illustrated in FIG. 9, except normalized for unity magnitude and ring widths dependant on SNR. The soft overlay data can then be derived from the distance off the unit circle, as illustrated in FIG. 10. This value must be saved for later combination with data recovered from the phase modulation.

Figure 11:
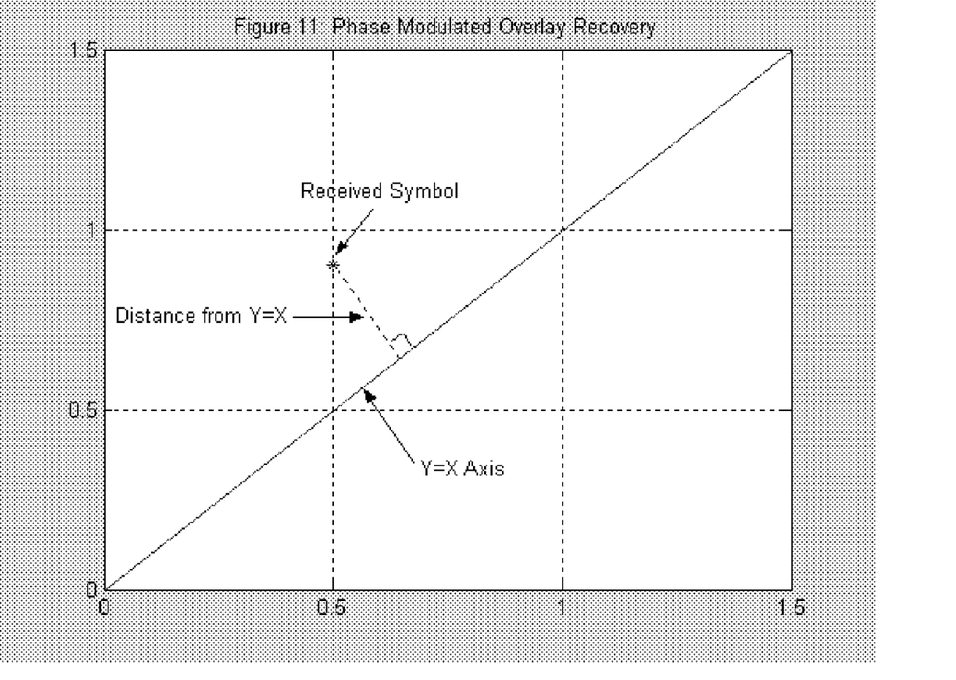
FIG. 11 illustrates phase modulated overlay recovery according to an exemplary embodiment of the present invention.

In order to recover the phase modulated overlay data, the equalized symbols must first be differentially demodulated and corrected for any common phase error offset. After common phase removal, the resultant constellation should resemble the constellation as illustrated in FIG. 6, except noise will form clouds around the original symbol locations. The overlay information is contained in the delta from the 45 degree axis within each quadrant. To simplify the measurements, all the symbols can be mapped back to the first quadrant by taking the absolute value of the symbols. The soft symbol value for the overlay data can then be taken as the delta from the y=x axis, as illustrated in FIG. 11.

If the information used to apply the amplitude and phase offset was the same, the results must be combined. The simplest form of combining would be adding the two results together. The combined signal would then be passed as a soft decoding value to a Forward Error Correction block to extract the original data sequence. Use of phase modulation by itself is limited due to the impact on current receivers, which will decrease in performance as the modulation angle is increased. The differential demodulation will also have a negative impact to the performance because differential modulation puts all the information in the phase difference between the carriers. Amplitude modulation avoids the loss due to differential demodulation but is limited in range of values. Even though the amplitude modulation algorithm keeps the average power constant, the amount of separation between the overlay symbols is still limited by the finite precision of the receivers. Together, the combined performance of amplitude and phase modulation offer a worthy approach to overlay modulation in COFDM systems and overcomes problems in the prior art.

In exemplary embodiments of the present invention, the disclosed systems and methods can be implemented in hardware or software, or any combination thereof, both specialized or otherwise. In exemplary embodiments of the present invention, the disclosed systems and methods can be implemented in one or more ASICs, or FPGAs, or the like, or in specialized systems designed to broadcast and receive modulated RF signals. In exemplary embodiments of the present invention, receivers using the disclosed systems and methods can be implemented in a receiver, such as for example, one of the various types of satellite radio receivers provided or licensed by Sirius XM Radio, Inc. Such receivers generally have one or more baseband chips that contain specialized hardware and/or software for demodulating and decoding a received satellite radio signal.

Similarly, in exemplary embodiments of the present invention, transmission systems using the disclosed systems and methods can be implemented in a transmitter complex, such as, for example, one of the various types of satellite radio transmitters utilized in generating and transmitting one of the Sirius XM Radio, Inc. signals.

While the present invention has been described with reference to certain exemplary embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed:

1. A method of transmitting additional data over a preexisting signal, comprising: providing a first modulated signal; and
    overlaying additional information on the first signal by changing the amplitude and phase of data symbols of said first modulated signal to create an output signal,
    wherein the first signal is a differential COFDM signal, and wherein said changing comprises adding a combination of amplitude and phase offsets from original QPSK symbols, applied for each information bit of the overlay data.

2. The method of claim 1, wherein a first overlay stage applies a fixed offset angle to the original QPSK prior to differential modulation to create a signal similar to one that would result from 8 Phase Shift Keying (8-PSK).

3. The method of claim 1, wherein the following equation is used to apply a phase offset to an original QPSK signal:

$$Ovly1I = \cos(\alpha)*SymI - Z*\sin(\alpha)*SymQ$$

$$Ovly1Q = \cos(\alpha)*SymQ + Z*\sin(\alpha)*SymI,$$

where SymI and SymQ are from the original QPSK symbol; Z is the information bit represented as +/−1; α=the modulation angle; and Ovly1 and Ovly1Q form the resulting overlay symbol pair.

4. The method of claim 3, wherein after said phase offset has been applied, the resulting symbols can be further modified as follows:

$$Ovly2I = D8pskI * \sqrt{A^{(Z)}}$$

$$Ovly2Q = D8pskQ * \sqrt{A^{(Z)}}$$

Where: D8pskI and D8pskQ are the differentially modulated symbol pair; A is the desired power offset; Z is the overlay data represented as +/−1; and Ovly2I and Ovly2Q form the resultant symbol pair.

5. The method of claim 1, wherein scaling of the amplitude can be such that the average power will remain the same.

6. The method of claim 4, wherein A can be programmable.

7. The method of claim 4, wherein A is limited to a range (1≤A≤K), where K is chosen suitable to the expected number system of the receivers.

8. The method of claim 1, wherein the overlay amplitude offset data can be decoded by computing the vector distance of each point and comparing against a center decision ring.

9. The method of claim 1, wherein said amplitude offset is applied after application of a phase offset and a differential modulation process.

10. A data processor, tangibly embodying a program of instructions executable by the data processor to implement a method of transmitting additional data over a preexisting signal, said method comprising:
    providing a first modulated signal; and
    overlaying additional information on the first signal by changing the amplitude and phase of data symbols of said first modulated signal to create an output signal,
    wherein the first signal is a differential COFDM signal, and
    wherein said changing comprises adding a combination of amplitude and phase offsets from the original QPSK symbols, applied for each information bit of the overlay data.

11. The data processor of claim 10, wherein a first overlay stage applies a fixed offset angle to the original QPSK prior to differential modulation to create a signal similar to one that would result from 8 Phase Shift Keying (8-PSK).

12. The data processor of claim 10, wherein the following equation is used to apply a phase offset to an original QPSK signal:

$$Ovly1I = \cos(\alpha)*SymI - Z*\sin(\alpha)*SymQ$$

$$Ovly1Q = \cos(\alpha)*SymQ + Z*\sin(\alpha)*SymI$$

where SymI and SymQ are from the original QPSK symbol; Z is the information bit represented as +/−1; α=the modulation angle; and Ovly1I and Ovly1Q form the resulting overlay symbol pair.

13. The data processor of claim 12, wherein after said phase offset has been applied, the resulting symbols can be further modified as follows:

$$Ovly2I = D8pskI * \sqrt{A^{(Z)}}$$

$$Ovly2Q = D8pskQ * \approx \sqrt{A^{(Z)}}$$

Where: D8pskI and D8pskQ are the differentially modulated symbol pair; A is the desired power offset; Z is the overlay data represented as +/−1; and Ovly2I and Ovly2Q form the resultant symbol pair.

14. The data processor of claim 10, wherein scaling of the amplitude can be such that the average power will remain the same.

15. The data processor of claim 13, wherein A can be programmable.

16. The data processor of claim 13, wherein A is limited to a range (1≤A≤K), where K is chosen suitable to the expected number system of the receivers.

17. The data processor of claim 10, wherein the overlay amplitude offset data can be decoded by computing the vector distance of each point and comparing against a center decision ring.

18. The data processor of claim 10, wherein said amplitude offset is applied after application of a phase offset and a differential modulation process.

19. The data processor of claim 10, wherein said data processor is one of an ASIC, a component of a baseband chip, and an FPGA.

20. A receiver, comprising:
    a first demodulation stage; a channel equalizer; and
    a second demodulation stage,
    wherein the first stage recovers overlay data from amplitude modulated phase offset symbols, and wherein the second demodulation stage differentially demodulates the equalized symbols, corrects for any common phase error offset, and determines phase overlay offset.

21. The method of claim 1, wherein to recover the overlay data at a receiver, channel amplitude equalization is used to extract said data.

* * * * *